J. MERRITT & W. A. SAWYER.
MACHINE FOR MANUFACTURING WIRE LINK MESH.
APPLICATION FILED JUNE 28, 1912. RENEWED MAR. 8, 1916.
1,186,927.
Patented June 13, 1916.
13 SHEETS—SHEET 12.
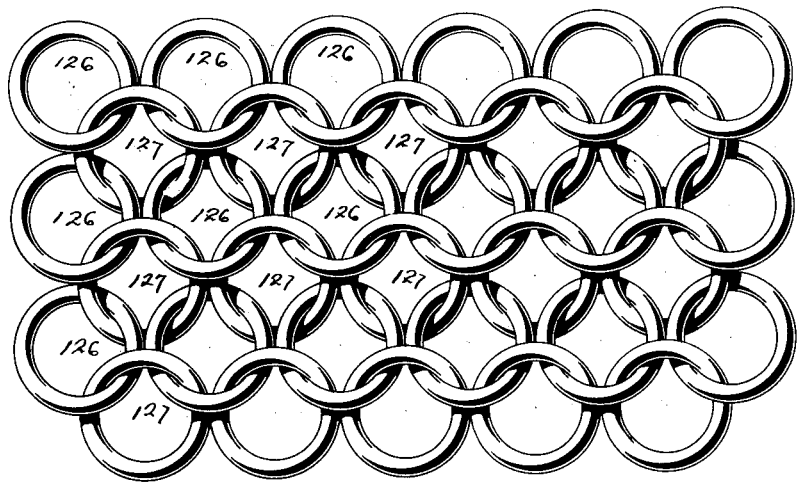
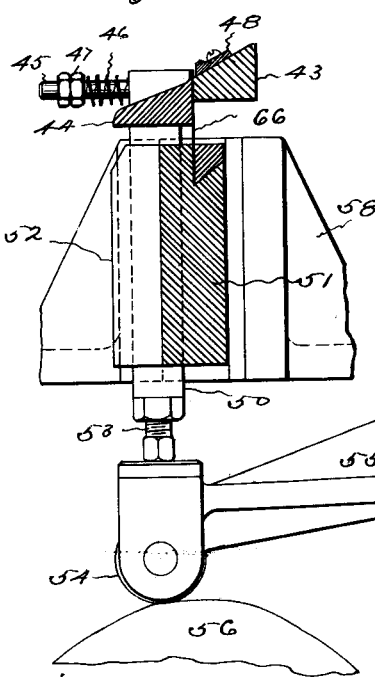
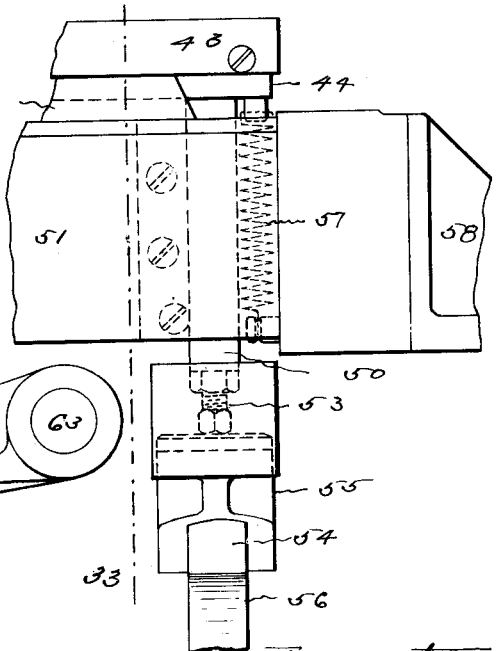
Witnesses:
Josephine M. Strempfer.
Charlotte S. Hull
Inventors:
Joseph Merritt &
William A. Sawyer,
by Harry R. Williams
atty.

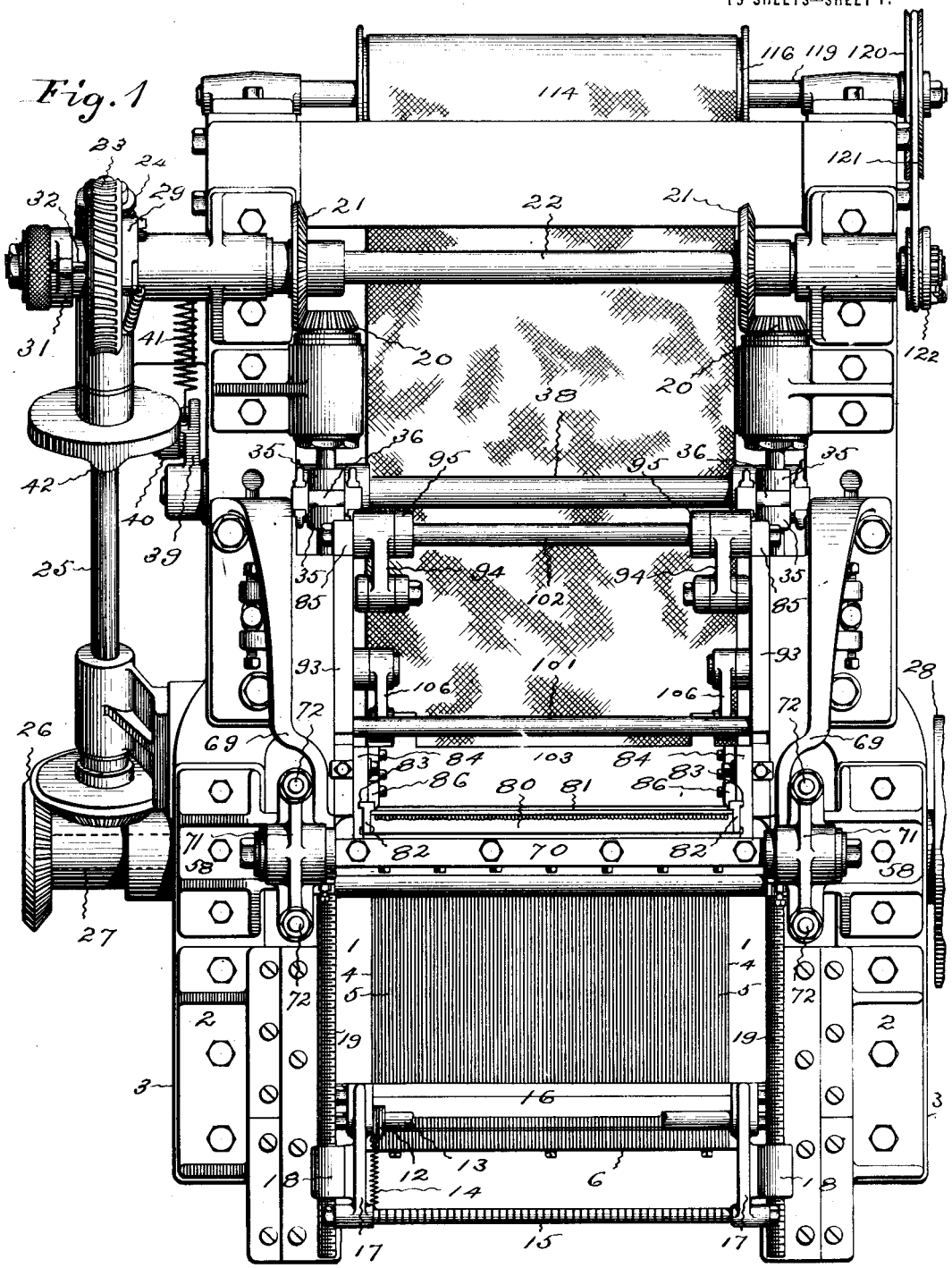

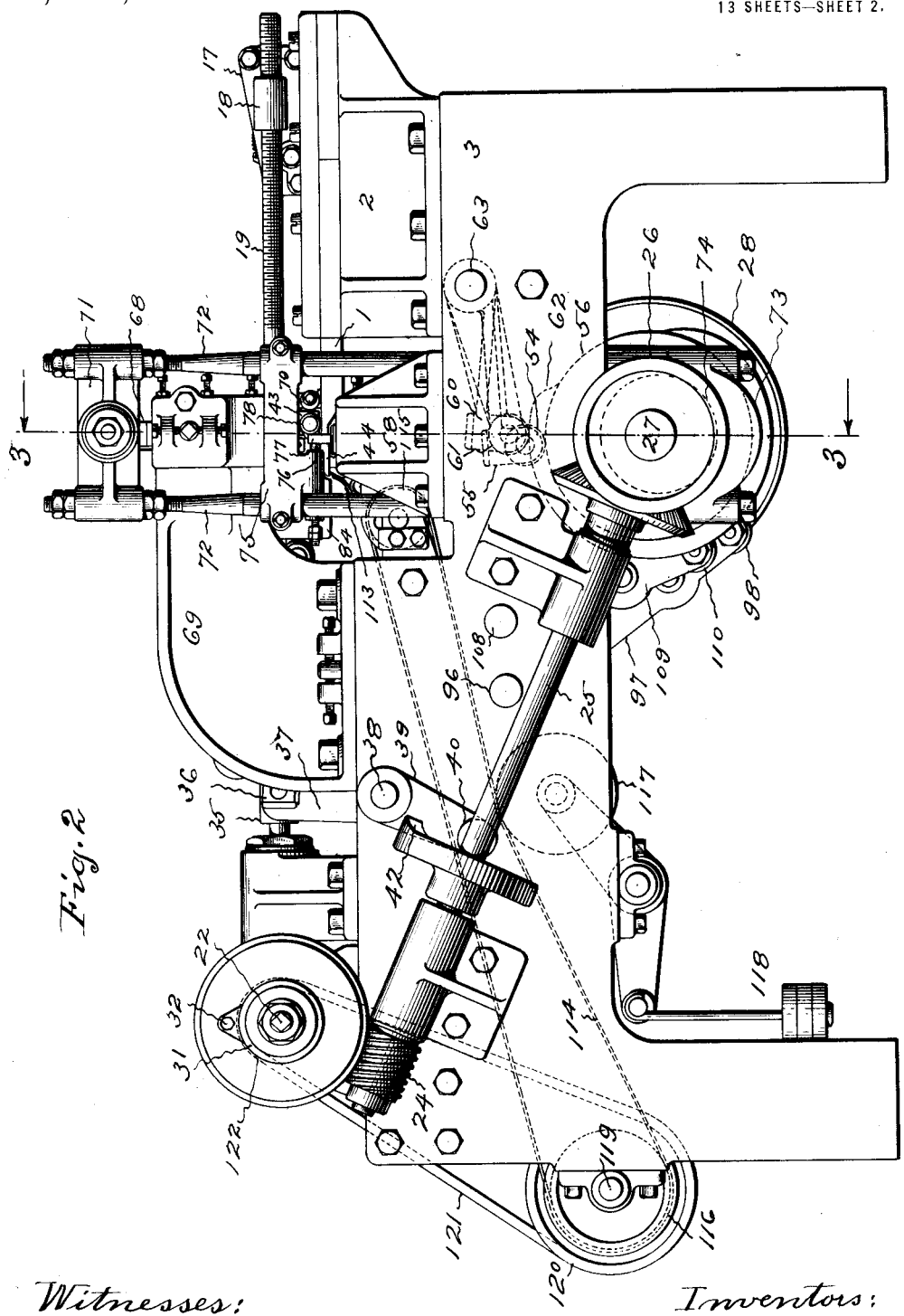

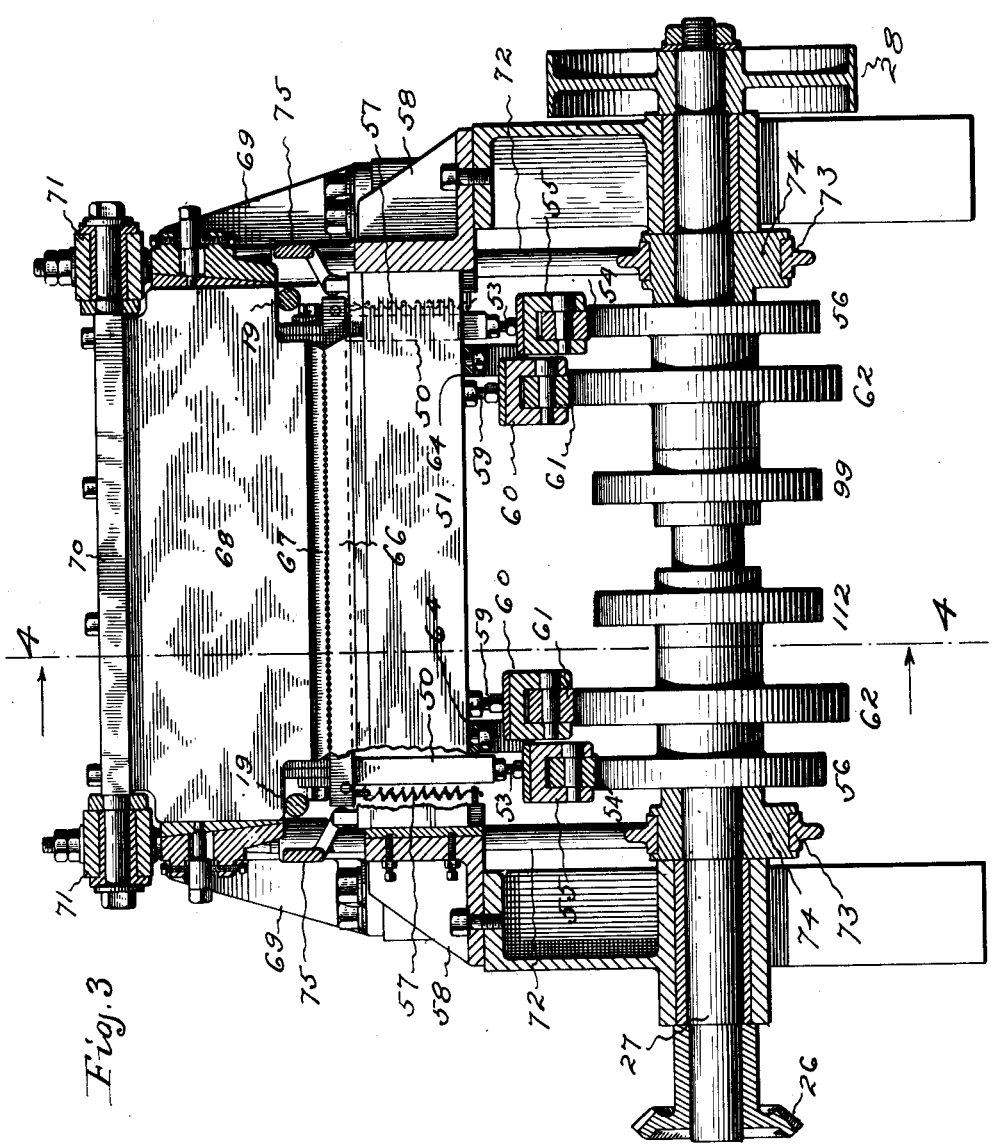

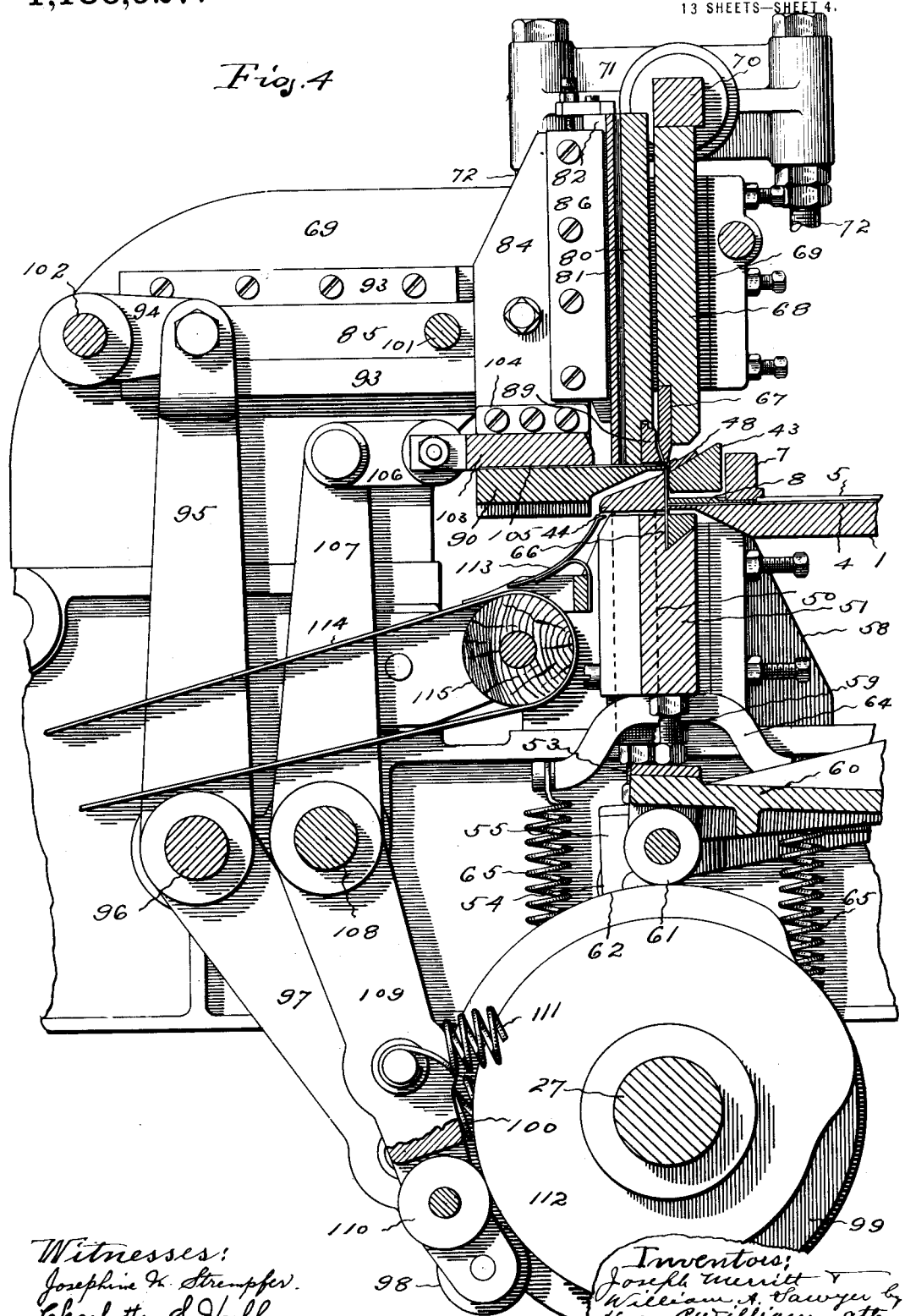

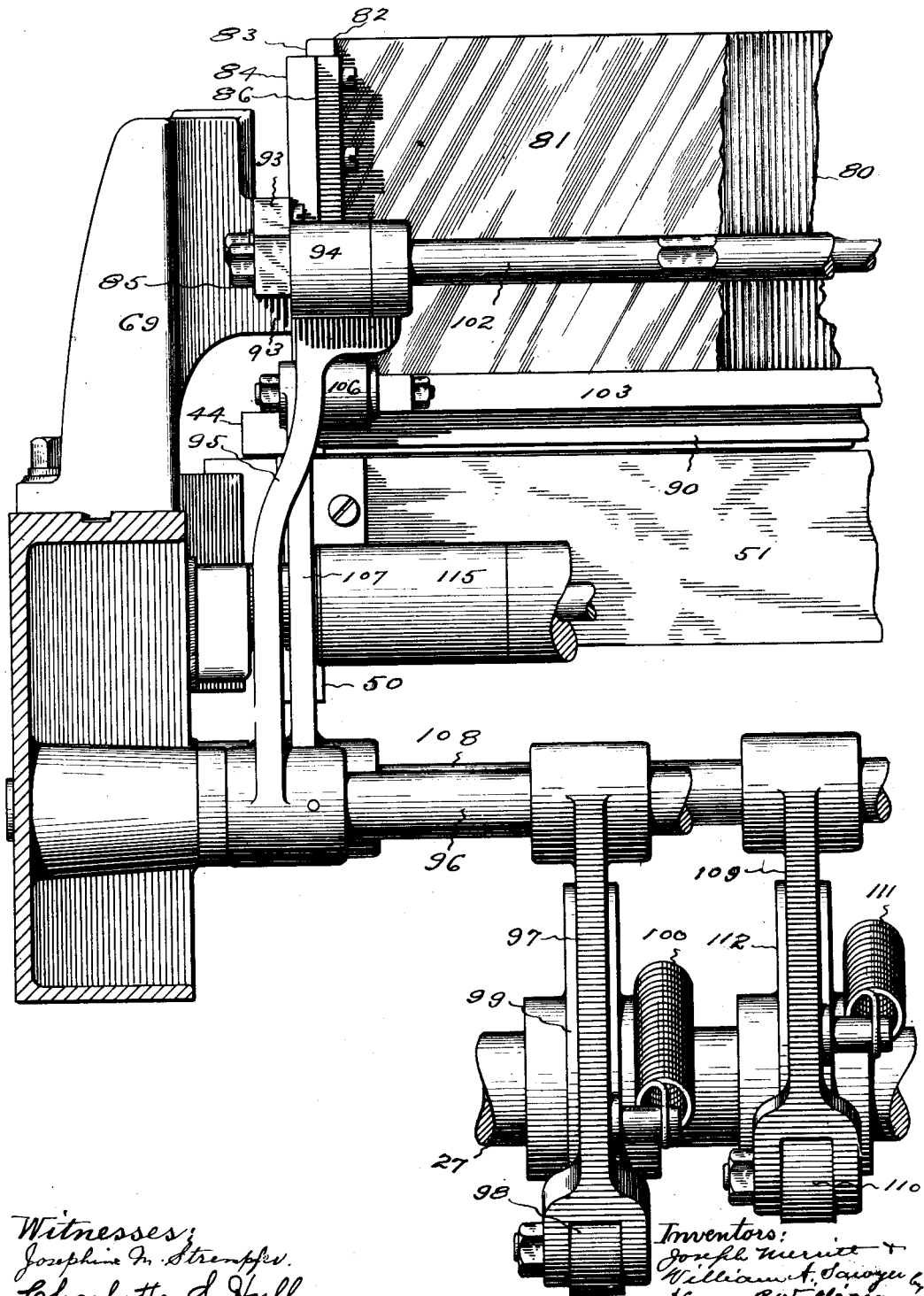

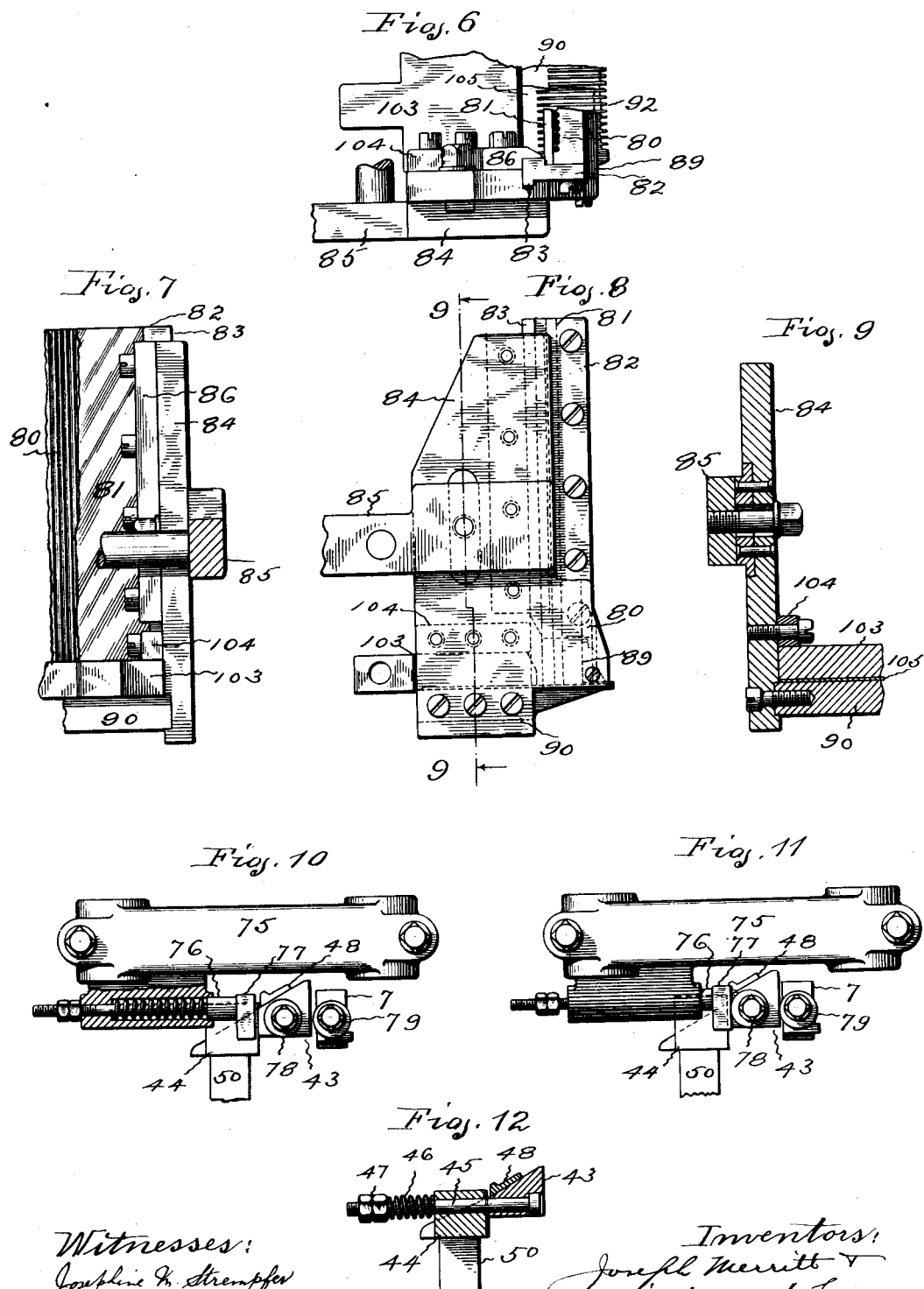

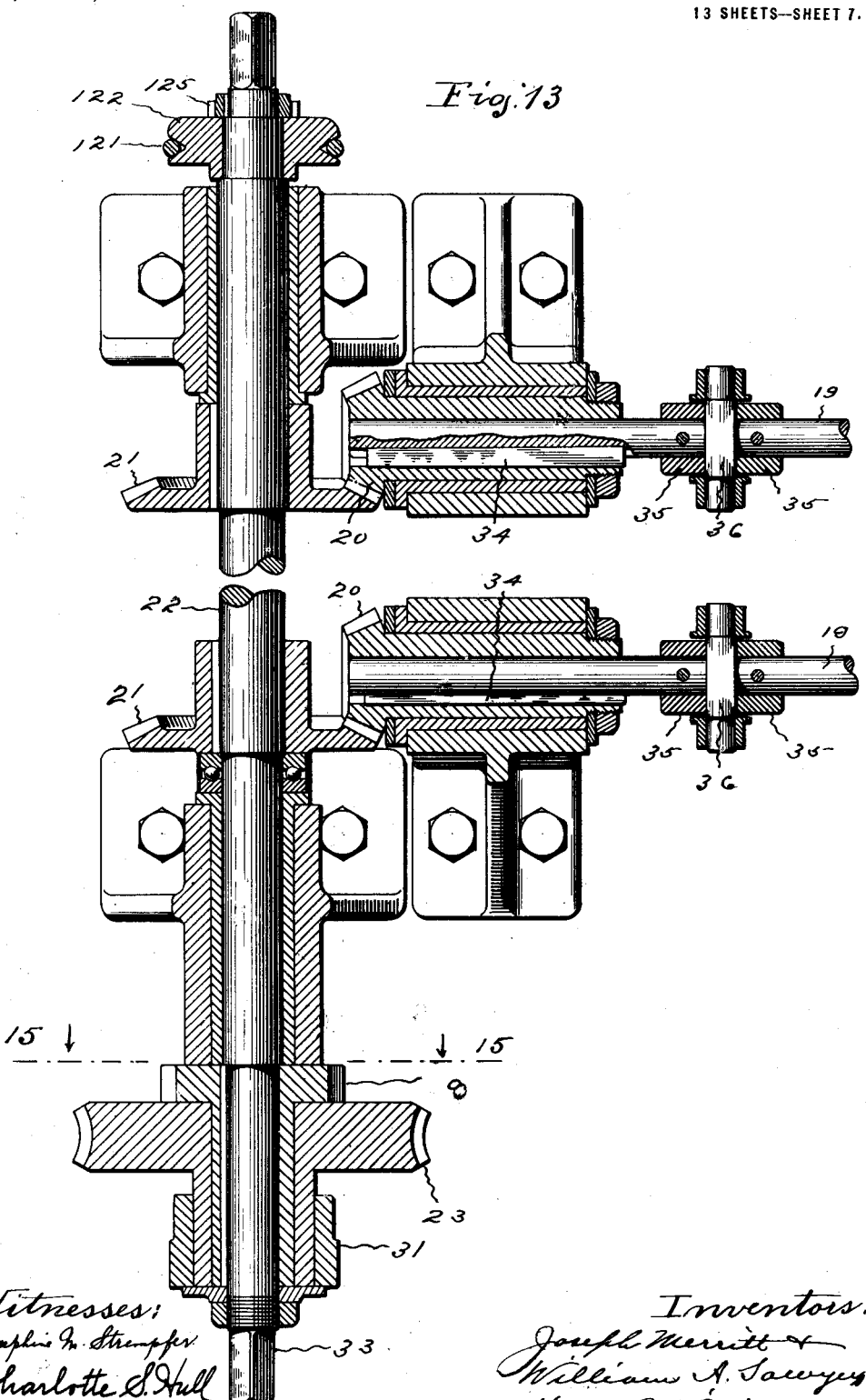

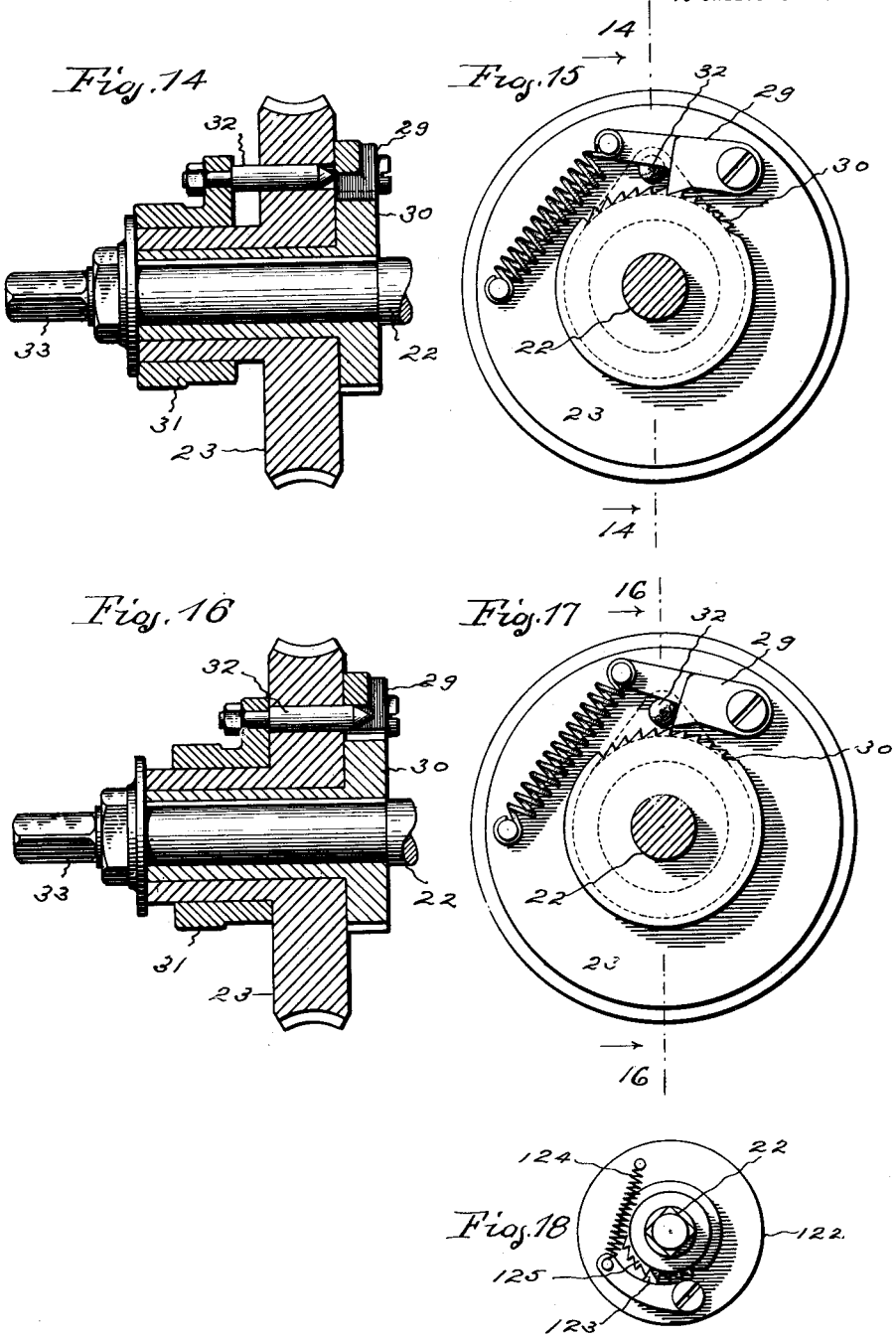

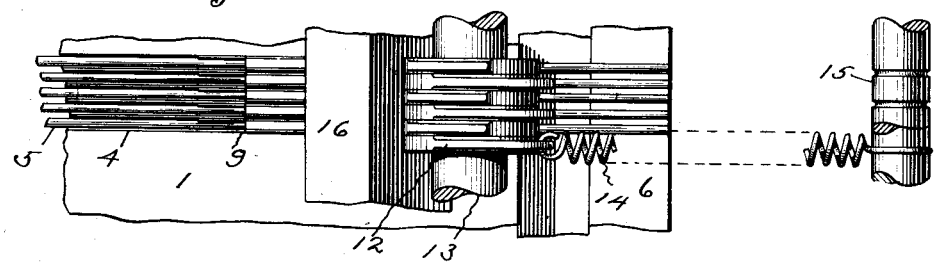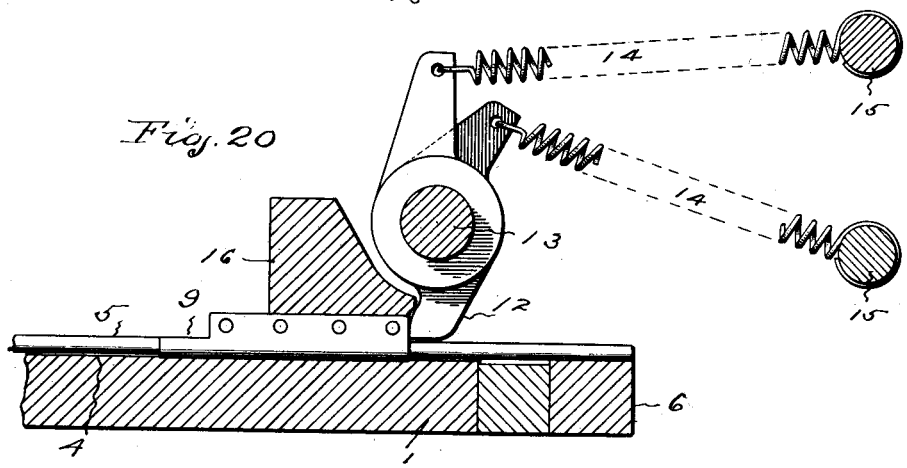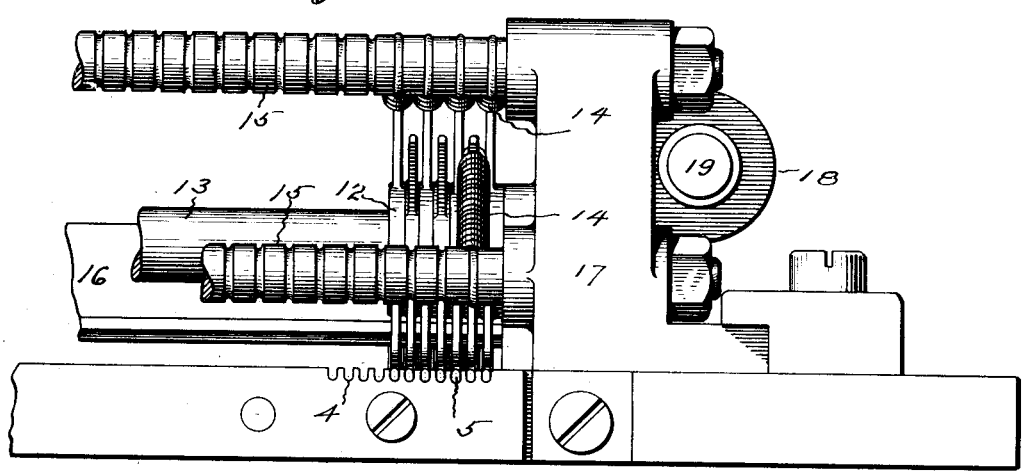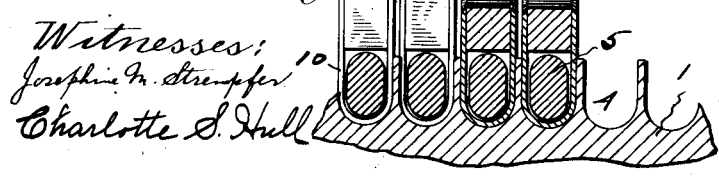

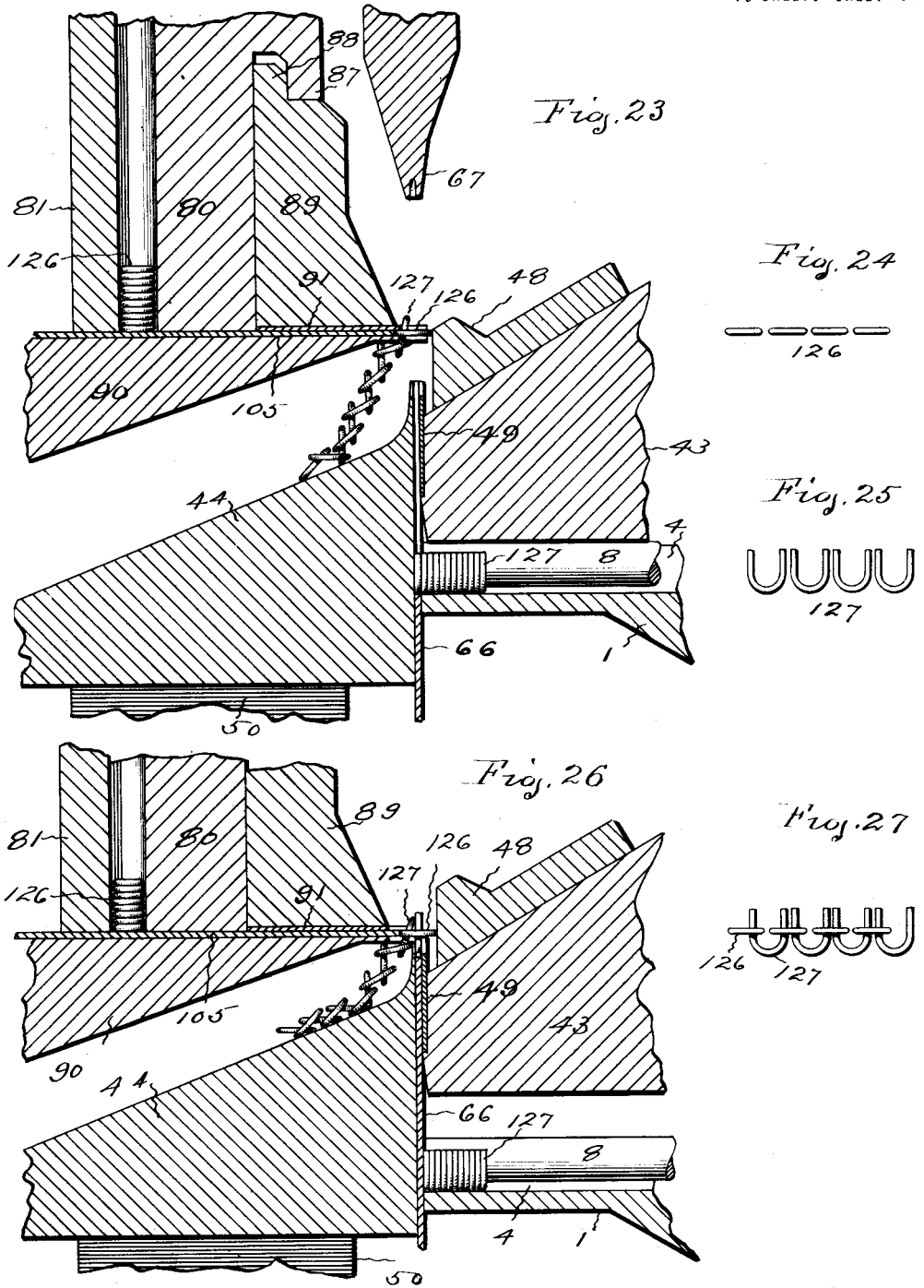

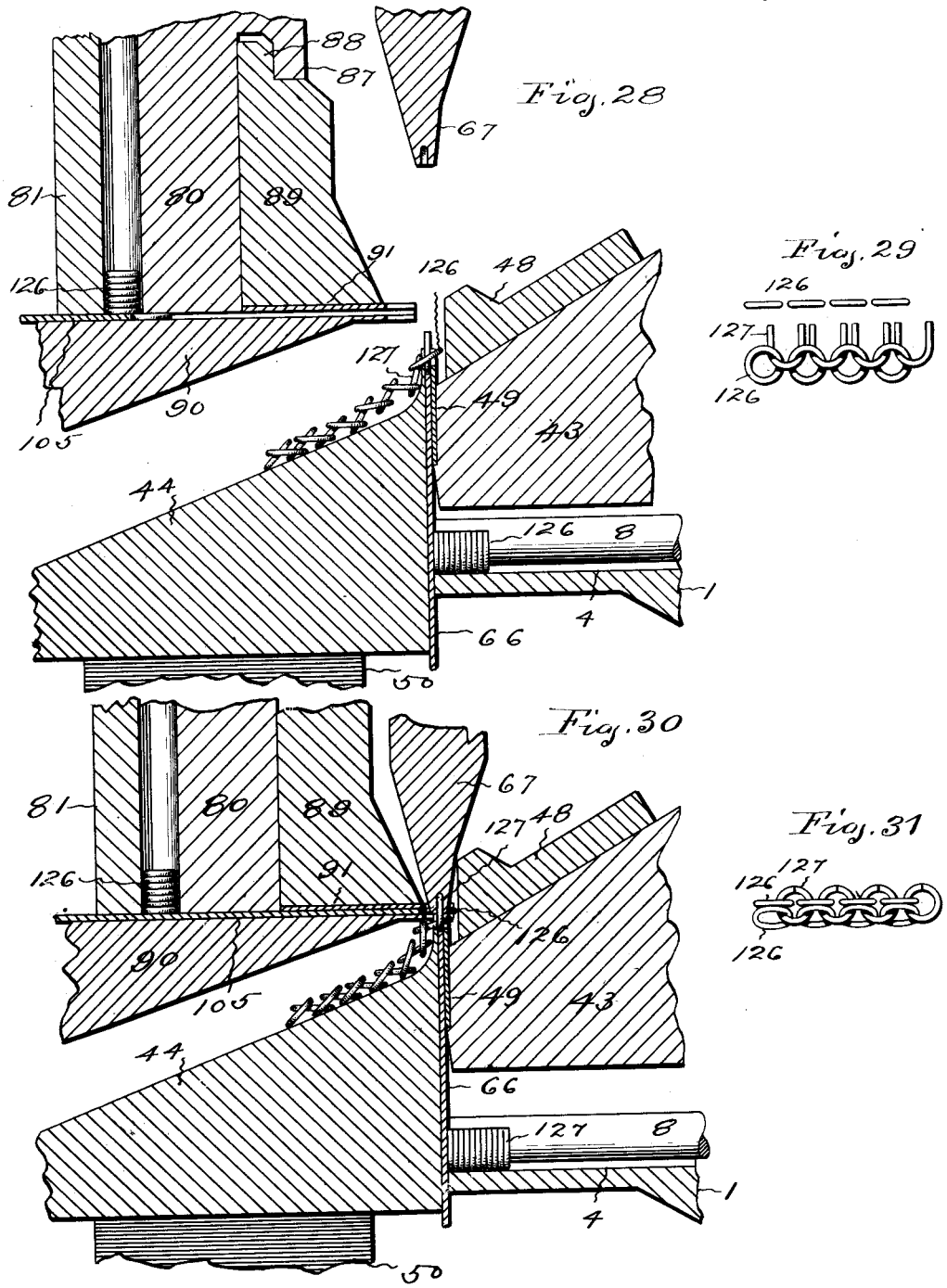

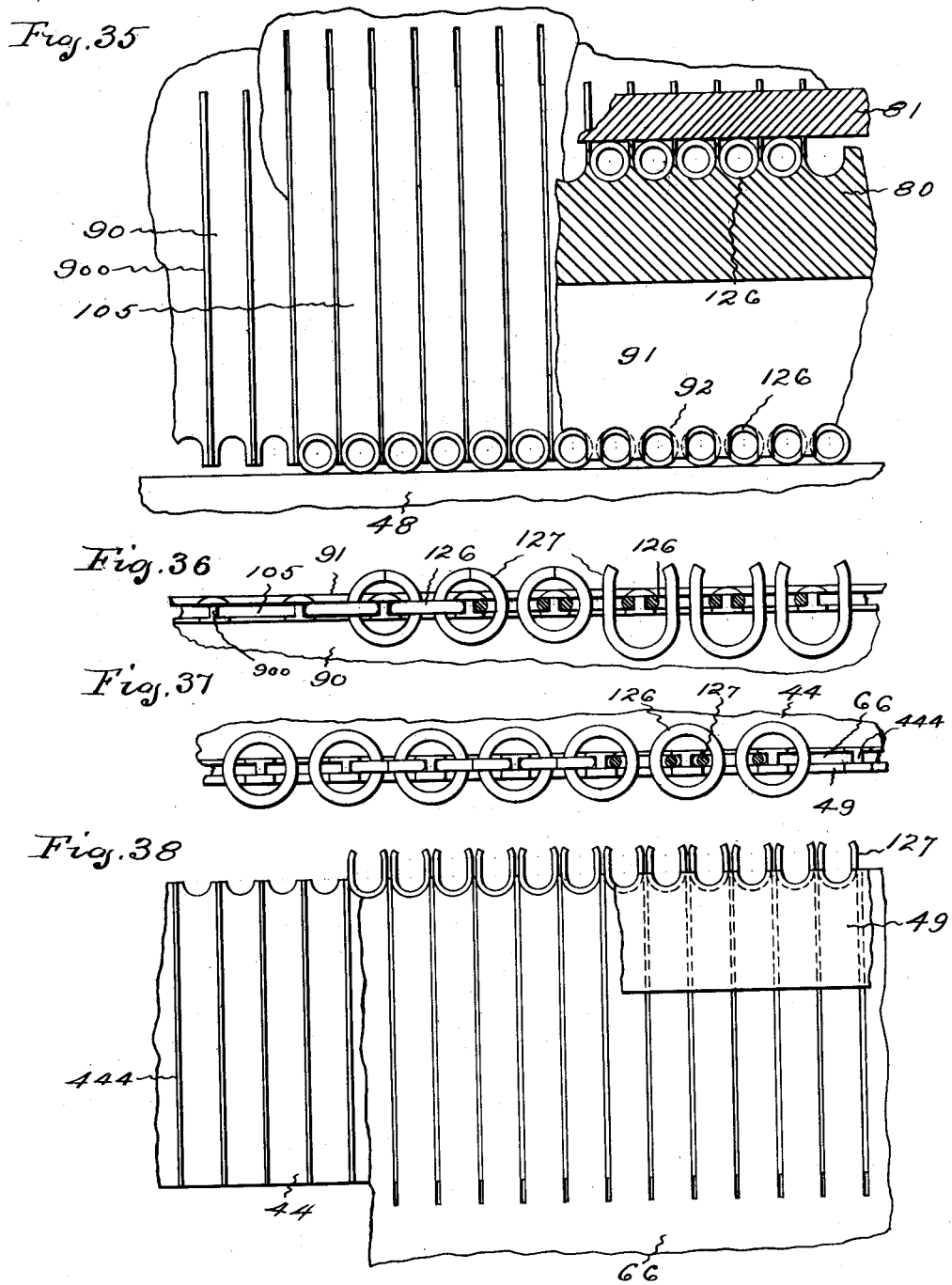

UNITED STATES PATENT OFFICE.

JOSEPH MERRITT, OF HARTFORD, AND WILLIAM A. SAWYER, OF WEST HARTFORD, CONNECTICUT; SAID SAWYER ASSIGNOR TO SAID MERRITT.

MACHINE FOR MANUFACTURING WIRE-LINK MESH.

1,186,927.   Specification of Letters Patent.   Patented June 13, 1916.

Application filed June 28, 1912, Serial No. 706,394. Renewed March 8, 1916. Serial No. 82,919.

*To all whom it may concern:*

Be it known that we, JOSEPH MERRITT and WILLIAM A. SAWYER, citizens of the United States, residing at Hartford and West Hartford, respectively, in the county of Hartford and State of Connecticut, have invented a new and useful Improvement in Machines for Manufacturing Wire-Link Mesh, of which the following is a specification.

This invention relates to a machine which is designed to manufacture metal link mesh, that is, a fabric which is formed of interlocked wire links.

The object of the invention is to provide a machine for manufacturing wire link mesh, which, automatically will very accurately and rapidly feed and assemble together rings and staples or open rings, and then form the staples into rings which interlock the previously formed rings and thus produce the mesh.

In this machine there is a vertically arranged magazine holding a large number of rings. These rings are located in parallel grooves or channels in the magazine one above the other in separated vertical rows, the number of rows of rings depending upon the width of the fabric to be produced. There is a horizontally arranged magazine loaded with a large number of open rings or staples. The staples are located on rods in parallel grooves in this magazine in horizontal rows, there being one less number of rows of staples than there are rows of rings. The mechanisms are so arranged that the bottom rings of the piles in the magazine are pushed forward in a row that is as long as the width of the fabric. The staples are fed backward from the magazine and a row pushed up until their upper free ends pass through the adjacent rings of the row pushed forward. The ring magazine and the ring carrier at the bottom of the magazine then move back a short distance leaving the mesh on the staples and the ring pusher is retracted to cut off the next row of rings. At the same time the staple carrier and pusher drop a little carrying with them the rings engaged by the staples which were pushed up through them. The ring carrier then comes forward and another row of rings is pushed over the upper unclosed ends of the staples and the staple carrier is again raised and the staples pushed up so that the free ends will pass through this second row of rings. At this time, while the staple pusher is rising a punch comes down, and the lower edge of this punch in conjunction with the upper edge of the staple pusher bends the staples into ring form and thus fastens the previously formed rings together. After the staples have been formed into rings the punch is lifted, the staple carrier is opened and lowered, the staple pusher descends and the magazine and ring carrier back off a little with the closed staples carried on the points at the front edge. This leaves the mesh formed hung by the rings that have been formed out of the staples on the front edge of the ring carrier. The ring carrier then comes forward and locates the rings over the staples, another row of staples is raised until their ends project through the rings and the process described for feeding the rings and closing the staples about them is automatically repeated as long as the machine is run and rings and staples are supplied. The machine illustrated was designed and has been built to feed 105 round rings and 104 staples of .015 of an inch wire, but the invention is not limited to a machine having this capacity, or using this size of wire, or forming round links, as the links may be of any shape, the wire of any size, and the magazine of any capacity.

Figure 1 of the accompanying drawings shows a plan of a machine which embodies the invention. Fig. 2 shows an elevation looking at the left-hand side of the machine. Fig. 3 is a vertical transverse section taken on the plane indicated by the dotted line 3—3 on Fig. 2, looking toward the rear at the staple pusher and the punch and showing the mechanisms which cause the pusher and holder to feed up the staples and the punch to move down and shape the staples into the rings which connect the already formed rings. Fig. 4 is, on larger scale, a vertical longitudinal section on the plane indicated by the dotted line 4—4 on Fig. 3 of the staple carrier, pusher and punch and the ring magazine, ring carrier and pusher, showing the mechanisms for moving the ring carrier and pusher. Fig. 5 is an elevation looking from the rear of the machine at the parts shown in Fig. 4. Fig. 6 shows a plan of one end of the ring magazine, the ring carrier and ring pusher. Fig. 7 shows a rear view of the parts shown in Fig. 6. Fig. 8 shows a side view of the parts seen in Fig. 7. Fig. 9 is a vertical section on the plane denoted by the dotted line 9—9 on Fig. 8. Fig. 10 is a side view, with a portion in section, of a part of the mechanism for opening the staple carrier, and in this view the parts are in such positions that the staple carrier is closed. Fig. 11 is a view of the parts shown in Fig. 10 in the positions occupied when the staple carrier is opened. Fig. 12 is a section showing the manner of connecting the parts of the staple carrier and the means for normally holding them closed. Fig. 13 is a horizontal section of a part of the mechanism for operating the staple feed, showing the means whereby the feed screw shafts may be reciprocated for feeding the staples and rotated for causing the feeding parts to follow up the staples as they are fed out of the magazine. Fig. 14 is a section through the worm wheel on one end of the feed shaft shown in Fig. 13, showing the trip pin drawn out so as to allow the driving pawl to engage the ratchet wheel teeth, the section being on the plane indicated by the dotted line 14—14 in Fig. 15. Fig. 15 is a side view of the mechanism shown in Fig. 14, the shaft section being on the plane indicated by the dotted line 15—15 in Fig. 13. Fig. 16 is a section similar to that shown in Fig. 14, with the trip pin pushed in so as to disengage the pawl from the driving ratchet wheel, and allow the feed screw shafts to be turned backward for returning the staple feeding means, the section being on the plane indicated by the dotted line 16—16 in Fig. 17. Fig. 17 is a side view of the parts shown in Fig. 16. Fig. 18 is a side view of the pawl and ratchet wheel on the other end of the feed shaft shown in Fig. 13, this pawl being provided to allow the feed shaft to run backward without moving the delivery conveyer. Fig. 19 is a fragmentary plan of the staple magazine and staple feeding parts. Fig. 20 is a side view of the parts shown in Fig. 19. Fig. 21 is a front view of the parts shown in Fig. 20. Fig. 22 is a transverse section on still larger scale through a part of the staple magazine, staple core rods and staple feeders. Fig. 23 is an enlarged fragmentary vertical section showing the relative positions of the ring magazine, carrier and pusher, and the staple magazine, carrier, and pusher after a row of staples has been raised and formed into rings for connecting previously formed rings, and the last row of rings is forward to receive the next row of staples. Fig. 24 shows a row of rings in the position occupied in Fig. 23. Fig. 25 shows a row of staples in the position occupied in Fig. 23. Fig. 26 is a similar section to that shown in Fig. 23 with the parts in the positions occupied when the staples are pushed up through the rings. Fig. 27 shows the staples pushed up through the rings as in Fig. 26. Fig. 28 shows the same parts in the positions occupied when the rings are transferred to the staples, the ring carrier and magazine has backed away, and the ring pusher has just cut off another row of rings from the bottom of the magazine. Fig. 29 shows the relations of the rings and staples in Fig. 28. Fig. 30 shows the same parts after the second row of rings has been pushed out and the staples raised through them, and the punch has come down so as to, with the staple holder and pusher, bend the staples into rings. Fig. 31 shows the relations of the rings and closed staples in Fig. 30. Fig. 32 shows on greatly enlarged scale a section of the mesh which is manufactured of rings and staples by this machine. Fig. 33 is a vertical section through the staple carrier and the staple pusher and the lower ram, showing the mechanism for raising and lowering the carrier, the section being taken on the plane indicated by the dotted line 33—33 on Fig. 34. Fig. 34 is a view looking from the front at the parts shown in Fig. 33. Fig. 35 shows a horizontal section of a portion of the ring magazine and its cover, and a plan of parts of the ring retaining plate, ring pusher and lower member of the ring carrier. Fig. 36 is a larger view looking toward the front edge of the lower ring carrier member, ring pusher and retaining plate, with rings and staples in different conditions. Fig. 37 is a view looking down at the top edge of portions of the back jaw of the staple carrier, the staple retaining plate and staple pusher, with rings and staples in different conditions. Fig. 38 is a view on smaller scale looking rearward at the parts shown in Fig. 37.

In the machine illustrated the staple magazine plate 1 is supported horizontally at its side edges by the side frames 2 that are secured to the top of the bed 3 at the front of the machine. This magazine plate, which extends rearward into the machine as far as the mechanism which cuts off and pushes a row of staples up to the staple carrier, has a large number of parallel grooves 4. In each groove is a rod 5, which in the form shown is oblong in cross section. These rods are fastened at their front ends to a bar 6 that is removably secured to the front edge of the magazine plate. Figs. 1, 19, 20. The spaces between the surfaces of these rods and the walls of the grooves are slightly larger than the diameter of the wire from which the staples are formed. The back ends of these removable rods are loose in the grooves but are held down by a bar 7 that extends across the machine frame above the magazine plate. Fig. 4. The staples with their open ends up are slipped on the free ends of these core rods until the grooves in the magazine plate are full. Fastened on the underside of the bar 7 in line with, and as continuations of the core rods, are fixed core rod extensions 8 which guide the staples as they are fed through the magazine grooves from the rods to the staple pusher and carrier. Fig. 4. Movable on each core rod is a staple feeder 9, Figs. 19, 20, which consists of a yoke-shaped piece 10 that embraces the core rod and a block 11 to which the yoke ends are fastened. Fig. 22. At the proper time these feeders are moved backward and push the staples along the removable core rods onto the short fixed extension rods so as to keep a supply at the inner end of the magazine.

Each staple feeder is engaged by the lower end of a lever 12. These levers are pivotally mounted side by side on a rod 13. Springs 14 connected between the upper ends of the levers and rods 15 hold the lower ends of the levers against the feeder bar 16 and cause them to press yieldingly against the feeders. Figs. 19, 20, 21. The lever rod 13, spring rods 15 and the feeder bar 16 together with the levers and springs are mounted on brackets 17 that are arranged to slide front and back on the top of the magazine plate. Figs. 1, 2, 21. On the outsides these brackets have threaded bosses 18 in which turn the threaded front ends of the feed screw shafts 19. Figs. 1, 2. The feed screw shafts extend toward the rear of the machine and are always slowly rotated when the machine is in operation so as to move the feed bar and feed levers backward as rapidly as the staples are cut off and taken up for connecting the rings. The rear ends of these staple-feed screw-shafts have bevel pinions 20 that are engaged by bevel gears 21 on a cross shaft 22. Figs. 1, 13. Loosely mounted on one end of the cross shaft is a worm wheel 23 that is engaged by a worm 24 on a shaft 25 which extends obliquely at one side of the bed, and which, by bevel gears 26, is connected with and is driven by the cam shaft 27. Figs. 1, 2. The cam shaft on the other side of the machine has a driving pulley 28. Figs. 1, 2, 3.

On the worm wheel 23 is a pawl 29. This pawl normally engages the teeth of a ratchet wheel 30 that is keyed to the cross-shaft 22 so that the cross shaft will be rotated by the worm wheel. Figs. 1, 14, 15. Sliding on the hub of the worm wheel 23 is a sleeve 31. This sleeve carries a pin 32 with a tapered point that extends into a hole through the worm wheel. When this sleeve is drawn out, the pawl carried by the worm wheel engages the ratchet keyed to the cross shaft, as shown in Figs. 14 and 15. When this sleeve is pushed in, the pin projects under the pawl and lifts it from the ratchet wheel so as to disconnect the worm wheel from the cross shaft, as shown in Figs. 16 and 17. When the worm wheel is disconnected from the cross shaft, the cross shaft may be turned backward by the application of a wrench to its squared end 33 for the purpose of turning the feed screw shafts backward and running the brackets carrying the feed levers and feed bar to the front so as to permit access to the magazine. When the worm wheel is connected with the cross-shaft by the ratchet and pawl, the feed bar and feed levers are moved rearward as the staples are used.

The pinions 20 are connected with the feed screw shafts by feathers 34 so that the shafts may be reciprocated without interfering with their rotation. Fig. 13. On each feed screw shaft are two collars 35, Fig. 13, and these are engaged by a yoke 36 at the upper end of a rocker lever 37. These two rocker levers are fastened to a transverse shaft 38 that outside of the bed has a rocker lever 39. Figs. 1, 2. A roll 40 on the end of the lever 39 is, by a spring 41, held in engagement with a cam 42 fixed on the oblique shaft 25. Figs. 1, 2. This cam at the proper time during each revolution of the machine oscillates the rocker arms and causes them to reciprocate the feed screw shafts with a quick movement. By these mechanisms, at each revolution of the machine a row of staples is quickly fed back and the feeders are moved back slowly a distance equal to the diameter of the wire of the staples so that the feeders are at all times in position to feed the staples.

At the rear edge of the staple magazine is the staple carrier. This staple carrier consists of two jaws, 43, 44, that extend across the machine. These jaws have a vertical movement together, one being carried by the other so that it may be opened and closed with relation thereto. The front or horizontally movable jaw 43 of the carrier is, near each end, mounted on a pin 45 that loosely passes through the back jaw 44. A spring 46, thrusting between the jaw 44 and the adjusting and check nuts 47 normally tends to draw the jaw 43 toward the jaw 44. Figs. 12, 33. On top of the movable jaw is a gage plate or ring stop 48. The limit of forward movement of the rings is determined by this gage plate. Figs. 23, 26. The front face of the jaw 44 has ribs 444 and between the ribs the top edge is notched. Fig. 38. A staple retaining plate 49 is fastened to the rear upper edge of the jaw 43. This plate, in connection with the ribbed front of the jaw 44, forms box-like inclosed paths up through which the staples are pushed. Figs. 23, 26, 28, 30, 37. The jaw 44 of the staple carrier upon which the jaw 43 is mounted, at each end is attached to the upper end of a bar 50. Fig. 3. These bars slide up and down in mortises in the ram 51, being held therein by guide brackets 52 that are fastened to the rear face of the ram. Figs. 33, 34. In the lower ends of the bars that hold the carrier jaws are adjusting screws 53. These screws rest on the ends of levers 55 that carry rollers 54 which bear on the peripheries of cams 56 mounted on the cam shaft. Figs. 3, 33. Springs 57, Fig. 3, connected between the ends of the jaw 44 and the brackets 58 that are fastened to the top of the bed on each side, normally draw the parts down and hold the screws at the ends of the bars in contact with the levers having the rolls that rest on the cams. These cams at the proper time lift the jaws and cause them to carry the staples up at the same time the pusher goes up.

The ends of the ram 51 are held vertically movable in guide ways in the inner faces of the brackets 58. Figs. 3, 4, 33. Adjusting screws 59 are screwed into the bottom edge of the ram 51, each side of the center. These screws are drawn down onto the free ends of levers 60 that carry rolls 61 which rest on the peripheries of cams 62 on the cam shaft. Figs. 3, 4. The levers 60 and the levers 55 are all mounted on the shaft 63 that extends across the bed. Fig. 2. Fastened to the lower edge of the ram 51 near each end is a yoke 64. Springs 65 are attached to the ends of these yokes for the purpose of drawing the ram down and holding the screws 59 against the levers 60, and keeping the rolls 61 in contact with the cams 62. Figs. 3, 4. Fastened in the upper end of the ram 51 and extending upwardly therefrom between the jaws 43 and 44 of the carrier is the staple pusher 66. This pusher is a thin metal comb-like plate having semi-circular notches in its upper edge that are of a diameter equal to the width of the staples to be pushed up. Figs. 3, 4, 38. The cams 62 through the levers 60 lift the pusher plate and cause it to cut off a row of staples at the rear end of the magazine and push them up through the inclosed paths between the carrier jaws, (Figs. 37, 38), and the cams 56 through the levers 55 raise and lower the carrier jaws with the staples at the necessary intervals to manipulate these staples. Figs. 3, 4, 23, 26, 28, 30.

The punch 67 for closing the upper open ends of the staples, which are boxed in by the carrier jaws and supported by the pusher, and forming them into rings is fastened to the lower edge of the ram 68. The lower edge of the punch is provided with semi-circular notches similar to those at the upper edge of the pusher and when the punch and staple pusher are brought together these notches provide openings which are the same size and shape as the rings into which the staples are formed. Figs. 3, 4. This insures perfectly formed rings. The ends of the upper ram 68 are vertically movable in ways in the inner faces of the brackets 69 that are fastened to the top of the bed. Figs. 3, 4. The upper edge of the ram 68 is fastened to a cross head 70, the ends of which are supported by yokes 71. Figs. 1, 3, 4. Each yoke is mounted on the upper ends of a pair of eccentric rods 72 which are attached to eccentric straps 73. These eccentric straps encircle eccentrics 74 on the cam shaft. Figs. 2, 3. When the cam shaft is rotated, these eccentrics raise and lower the upper ram and the punch carried thereby.

On each pair of eccentric rods 72 is a cross bar 75. Figs. 2, 10, 11. Each of these cross bars carries a spring plunger 76, the heads 77 of which, as the eccentric rods are raised and lowered and are swung from side to side by the eccentrics, engage blocks 78 for moving the jaw 43 away from the jaw 44. These blocks are in the form of eccentric rolls so that the necessary adjustment may be obtained. In front of the jaw 43 are stop blocks 79. These are fastened to the ends of the fixed cross bar 7 that extends across the machine frame above the magazine plate, and these are also in the form of eccentric blocks for adjusting the amount of forward movement of the jaw 43. Figs. 10, 11. When the pusher pushes up the staples the jaws are opened by the swing of these spring plungers carried by the eccentric rods, and after the staples have been pushed up, the swing of the eccentric rods carries the plungers away and allows the springs to close the jaw 43 against the jaw 44. These parts also cause the jaw 43 to be opened from the jaw 44 after the staples have been formed into rings, and when the staple pusher goes down for cutting off another row of staples.

The ring magazine consists of a plate 80 provided with parallel grooves equal in number to the largest number of rings that are to be used to form the width of the mesh. The rings are loaded in these grooves and a cover 81 is placed over the back. The covered magazine plate containing the piles of rings is set vertically in the machine. Figs. 1, 4, 5. Fastened to each side edge of the magazine plate is a bar 82 that has a tongue 83 which is held in a groove in the head 84 of the magazine carrier slide 85, by a cap 86. Figs. 6, 7, 8. The magazine plate on its front near the lower edge has a lip 87 that engages a tongue 88 on the top of the bar 89 which forms the upper member of the ring carrier and which is fastened at its ends to the lower ends of the heads 84 of the magazine carrier slides 85. The ends of the lower member 90 of the ring carrier, which forms the floor or bottom of the ring magazine, are also fastened to the lower ends of the heads of the magazine carrier slide. Figs. 4, 7, 9. Fastened to the under side of the bar 89 is a ring retaining plate 91. There is a space equal to the diameter of the wire from which the rings are formed between this retaining plate and the lower member 90 of the ring carrier. Figs. 23, 26, 28, 30. The front edges of the member 90 and of the plate 91 are notched so as to form a comb 92. Figs. 6, 35. On the upper face of the member 90 are ribs 900. Fig. 35. These ribs, together with the upper face of the member 90 and the lower face of the retaining plate 91 form box-like paths which inclose and guide the rings when they are pushed forward. Fig. 36.

The magazine carrier slides 85 are movable horizontally back and forth along the inner faces of the brackets 69 between the guides 93. Figs. 4, 5. The rear ends of these slides are connected by links 94 with the upper ends of rocker levers 95. These levers are fastened to a rocker shaft 96, which extends across the machine and at one side of the center has a rocker arm 97. The lower end of this rocker arm has a roll 98 that runs in contact with the cam 99 on the cam shaft. A spring 100 connected with the rocker arm holds the roll in contact with the cam. Figs. 4, 5. The slides 85 are tied together so they will move in unison, by a rod 101 near the front end and the rod 102 near the back end, to which the links 94 are connected. Figs. 1, 4, 5.

The ring pusher slide 103 is movable front and back above the floor 90 of the ring magazine. This slide is supported at its ends by the heads 84 of the magazine carrier slides 85, and is held in place by the caps 104. Figs. 4, 7, 9. The rear portion of the ring pusher 105 is fastened to the bottom of this slide. Fig. 4. This pusher is a thin comb-like plate having in its front edge semi-circular notches of a diameter equal to the width of the rings. Figs. 6, 35, 36. The pusher is movable back and forth below the bottom of the magazine and under side of the ring retaining plate and above the top of the lower member of the ring carrier for pushing the rings out of the bottom of the magazine into the box-like paths of the carrier. Figs. 23, 26, 28, 30. Links 106 connect the back of the ring pusher slide 103 with the upper ends of rocker levers 107 that are mounted on the rocker shaft 108. On this shaft is a rocker lever 109 which has a roll 110 that is held by the spring 111 in contact with the cam 112 on the cam shaft. Figs. 4, 5.

At the rear end of the space between the back member 44 of the staple carrier, and the lower member 90 of the ring carrier, through which space passes the mesh as it is formed, is an apron 113 which directs the mesh onto the endless delivery belt 114. Fig. 4. This belt passes around a roller 115 that extends transversely of the machine below the back end of the apron, and a roller 116 that extends transversely at the rear of the bed. A roller 117 is made to bear against the lower side of the belt by means of the weight 118 for keeping the belt properly stretched. Fig. 2. On the end of the shaft 119 that carries the roller 116 is a pulley 120. This pulley is connected by a belt 121 with a pulley 122. Figs. 1, 2. The pulley 122 is loosely mounted on the end of the transverse driving shaft 22, and it carries a pawl 123 which is drawn by a spring 124 into contact with the teeth of the ratchet wheel 125 that is fixed to the shaft 22. Fig. 18. When the machine is in operation, this pawl and ratchet through the pulleys and belts drives the delivery belt. When it is desired to turn the staple feed back, the ratchet turns under the pawl so that the delivery belt will not be moved backward.

When this machine is in operation the mechanisms move the ring pusher forward in such manner that it cuts off and carries forward between the upper and lower members of the ring carrier the lowest rings of the piles in the magazine grooves, and the ring carrier moves forward and takes this row of rings against the stop over the staple carrier, as shown in Fig. 23. The rings and staples are then in the relative positions shown in Figs. 24 and 25. The mechanisms cause the staple pusher to move up and cut off and lift the last staples 127 of the rows in the staple magazine, and with the carrier take these staples up through the rings, as shown in Fig. 26. The relations of the rings and staples are then as shown in Fig. 27. The staple carrier then drops and the ring carrier moves backward while the ring pusher is drawn away back to cut off another row of rings. During this operation, the rings which were previously fed forward are held by the staple carrier and the staples that were pushed through them, as shown in Fig. 28. The rings and staples are then in the relations shown in Fig. 29. The continued operation of the machine causes the ring pusher to push the rings it has cut off forward, and the ring carrier also moves forward so as to take this row of rings again over the staple pusher. The staple carrier and pusher again come up and carry the staples through the row of rings at the end of the ring carrier and then the punch comes down, and while the staples are held between the parts of the staple carrier, and the staple pusher is moving up, the ends of the staples are closed so as to form the staples into rings, as shown in Fig. 30. The relative positions of the rings and closed staples at this time are as shown in Fig. 31. This action is repeated, the rings being pushed forward and the staples being carried up and bent into rings, and mesh produced as shown on greatly enlarged scale in Fig. 32. This mesh as it is formed passes down between the ring carrier and staple carrier onto the delivery belt, which draws it back as fast as the mesh is formed.

The invention claimed is:

1. A machine for manufacturing link mesh, having a ring magazine, a staple magazine, mechanism for cutting off rings from the ring magazine and presenting them to the staples, mechanism for cutting off staples from the staple magazine and passing the free ends through the rings, and mechanism for closing the free ends of the staples after they have been passed through the rings.

2. A machine for manufacturing link mesh, having a ring magazine, a staple magazine, mechanism for cutting off rings from the ring magazine and presenting them to the staples, mechanism for cutting off staples from the staple magazine and passing the free ends through the rings, and a punch for closing the free ends of the staples after they have been passed through the rings.

3. A machine for manufacturing link mesh, having a ring magazine, a staple magazine, mechanism for cutting off rings from the ring magazine and presenting them to the staples, mechanism for cutting off staples from the staple magazine and passing the free ends through the rings, a punch for closing the free ends of the staples after they have been passed through the rings, and mechanism for delivering the mesh thus formed.

4. A machine for manufacturing link mesh, having a ring magazine, a staple magazine, a pusher for cutting off rings from the ring magazine and presenting them to the staples, mechanism for cutting off staples and passing their free ends through the rings thus pushed out, and mechanism for closing the free ends of the staples after they have been passed through the rings.

5. A machine for manufacturing link mesh having a ring magazine, a staple magazine, a carrier for receiving the rings from the ring magazine and presenting them to the staples, mechanism for passing the free ends of the staples through the rings presented by the carrier, and mechanism for closing the free ends of the staples after they have been passed through the rings.

6. A machine for manufacturing link mesh having a ring magazine, a staple magazine, a pusher for cutting off rings from the ring magazine, a carrier for presenting the pushed rings to the staples, mechanism for passing the free ends of the staples through the rings presented by the carrier, and mechanism for closing the free ends of the staples after they have been passed through the rings.

7. A machine for manufacturing link mesh having a ring magazine, a staple magazine, mechanism for cutting off rings from the ring magazine and presenting them to the staples, a feeder for feeding staples from the staple magazine, mechanism for passing the free ends of the fed staples through the rings, and mechanism for closing the free ends of the staples after they have been passed through the rings.

8. A machine for manufacturing link mesh having a ring magazine, a staple magazine, mechanism for cutting off rings from the ring magazine and presenting them to the staples, a pusher for cutting off staples, a carrier for passing the open ends of the staples through the rings, and mechanism for closing the free ends of the staples after they have been passed through the rings.

9. A machine for manufacturing link mesh having a ring magazine, a staple magazine, mechanism for cutting off rings from the ring magazine and presenting them to the staples, a carrier for passing the free ends of the staples from the staple magazine through the rings, and mechanism for closing the free ends of the staples after they have been passed through the rings.

10. A machine for manufacturing link mesh having a ring magazine, a staple magazine, mechanism for cutting off rings from the ring magazine and presenting them to the staples, mechanism for feeding staples, a pusher for cutting off staples from the staple magazine, a carrier for receiving the staples and passing the free ends through the rings, and mechanism for closing the free ends of the staples after they have been passed through the rings.

11. A machine for manufacturing link mesh having a ring magazine, a staple magazine, a pusher for cutting off rings from the ring magazine, a carrier for presenting the rings to the staples, mechanism for feeding the free ends of the staples through the rings, and mechanism for closing the free ends of the staples after they have been passed through the rings.

12. A machine for manufacturing link mesh having a ring magazine, a staple magazine, a pusher for cutting off rings from the ring magazine, a carrier for receiving the rings and presenting them to the staples, a pusher for cutting off and feeding staples from the staple magazine, and mechanism for closing the free ends of the staples after they have been pushed through the rings.

13. A machine for manufacturing link mesh having a ring magazine, a staple magazine, a pusher for cutting off rings from the ring magazine, a carrier for presenting the rings to the staples, a carrier for passing the free ends of the staples through the rings, and mechanism for closing the free ends of the staples after they have been passed through the rings.

14. A machine for manufacturing link mesh having a ring magazine, a staple magazine, a pusher for cutting off rings from the ring magazine, mechanism for feeding the staples, a pusher for cutting off the staples as they are fed, and mechanism for closing the free ends of the staples after they have been pushed through the rings.

15. A machine for manufacturing link mesh having a ring magazine, a staple magazine, a pusher for cutting off rings from the ring magazine, mechanism for feeding staples, a carrier for receiving the fed staples and passing the free ends through the rings, and mechanism for closing the free ends of the staples after they have been carried through the rings.

16. A machine for manufacturing link mesh having a ring magazine, a staple magazine, a carrier for presenting the rings to the staples, mechanism for feeding the staples, mechanism for cutting off and pushing the staples through the rings, and mechanism for closing the free ends of the staples after they have been pushed through the rings.

17. A machine for manufacturing link mesh having a ring magazine, a staple magazine, a carrier for presenting the rings to the staples, mechanism for feeding staples, mechanism for carrying the free ends of the staples through the rings, and mechanism for closing the free ends of the staples after they have been carried through the rings.

18. A machine for manufacturing link mesh, having a ring magazine, a staple magazine, mechanism for carrying the rings to the staples, a pusher for cutting off staples, mechanism for carrying the free ends of the staples through the rings, and mechanism for closing the free ends of the staples after they have been carried through the rings.

19. A machine for manufacturing link mesh, having a ring magazine, a staple magazine, a pusher for cutting off rings from the ring magazine, a carrier for presenting the rings to the staples, mechanism for feeding the staples, a pusher for cutting off the fed staples, and mechanism for closing the free ends of the staples after they have been pushed through the rings.

20. A machine for manufacturing link mesh, having a ring magazine, a staple magazine, a pusher for cutting off rings from the ring magazine, a carrier for presenting the rings to the staples, mechanism for feeding the staples, a carrier for carrying the free ends of the staples through the rings, and mechanism for closing the free ends of the staples after they have been carried through the rings.

21. A machine for manufacturing link mesh, having a ring magazine, a staple magazine, a pusher for cutting off rings from the ring machine, a carrier for presenting the rings to the staples, a pusher for cutting off staples from the staple magazine, a carrier for passing the free ends of the staples through the rings, and mechanism for closing the free ends of the rings after they have been passed through the staples.

22. A machine for manufacturing link mesh having a ring magazine, a staple magazine, a pusher for cutting off rings from the ring magazine, a carrier for presenting the rings to the staples, mechanism for feeding the staples, a pusher for cutting off the fed staples, a carrier for carrying the free ends of the staples through the rings, and mechanism for closing the free ends of the staples after they have been passed through the rings.

23. A machine for manufacturing link mesh, having mechanism for successively feeding in a horizontal plane rows of loose rings and presenting them to staples, mechanism for feeding in a vertical plane rows of staples and passing the free ends through the rings of two rows, and mechanism for closing the free ends of the staples after each has been passed through four adjacent rings.

24. A machine for manufacturing link mesh, having a ring carrier for successively presenting rows of loose rings in a horizontal plane to the staples, a staple carrier for passing the free ends of the staples through the rings of two rows, and mechanism for closing the free ends of the staples after each has been passed through four adjacent rings.

25. A machine for manufacturing link mesh, having a pusher for advancing loose rings, a carrier for presenting the loose rings to the staples, a pusher for advancing formed staples, a carrier for passing the free ends of the staples through the rings, and mechanism movable toward the staple carrier for closing the free ends of the staples after each has been passed through four adjacent rings.

26. A machine for manufacturing link mesh, having a ring guide, a pusher for pushing a row of loose rings through the ring guide, a staple guide, a pusher for pushing a row of formed staples through the staple guide, said mechanism passing the free ends of the staples through the rings of two rows, and mechanism for closing the free ends of the staples after each has been passed through four adjacent rings.

27. A machine for manufacturing link mesh having a vertically arranged ring magazine, mechanism for cutting off rings from the lower end of the ring magazine and presenting them to the staples, a staple magazine, mechanism for cutting off staples from the staple magazine and passing the free ends through the rings, and mechanism for closing the free ends of the staples after they have been passed through the rings.

28. A machine for manufacturing link mesh having a ring magazine with parallel grooves arranged vertically for holding the rings, mechanism for cutting off rings from the bottom of the ring magazine and presenting them to the staples, a staple magazine, mechanism for cutting off staples from the staple magazine and passing the free ends through the rings, and mechanism for closing the free ends of the staples after they have been passed through the rings.

29. A machine for manufacturing link mesh having a ring magazine provided with vertically arranged parallel grooves for holding the rings, a plate covering said grooves, mechanism for cutting off rings from the lower end of the ring magazine and presenting them to the staples, a staple magazine, mechanism for cutting off staples from the staple magazine and passing the free ends through the rings, and mechanism for closing the free ends of the staples after they have been passed through the rings.

30. A machine for manufacturing link mesh having a vertically arranged ring magazine provided with parallel grooves, said magazine being removably held by its edges, mechanism for cutting off rings from the lower end of the ring magazine and presenting them to the staples, a staple magazine, mechanism for cutting off staples from the staple magazine and passing the free ends through the rings, and mechanism for closing the free ends of the staples after they have been passed through the rings.

31. A machine for manufacturing link mesh having a vertically arranged ring magazine, mechanism for moving the ring magazine back and forth, mechanism for cutting off rings from the ring magazine and presenting them to the staples, a staple magazine, mechanism for cutting off staples from the staple magazine and passing the free ends through the rings, and mechanism for closing the free ends of the staples after they have been passed through the rings.

32. A machine for manufacturing link mesh having a ring magazine, a ring carrier, said magazine being supported by said carrier, mechanism for moving the carrier and magazine back and forth, mechanism for cutting off rings from the ring magazine and presenting them to staples, a staple magazine, mechanism for cutting off staples from the staple magazine and passing the free ends through the rings, and mechanism for closing the free ends of the staples after they have been passed through the rings.

33. A machine for manufacturing link mesh having a ring magazine, a ring carrier, said magazine being removably located on said carrier, mechanism for moving the carrier back and forth, mechanism for cutting off rings from the ring magazine and presenting them to staples, a staple magazine, mechanism for cutting off staples from the staple magazine and passing the free ends through the rings, and mechanism for closing the free ends of the staples after they have been passed through the rings.

34. A machine for manufacturing link mesh having a ring magazine arranged vertically in the machine, a plate movable back and forth horizontally across the lower end of the magazine for removing the lowest rings therefrom, mechanism for reciprocating the plate and causing it to cut off rings and push them forward, a staple magazine, mechanism for cutting off staples from the staple magazine and passing the free ends through the rings pushed forward by the plate, and mechanism for closing the free ends of the staples after they have been passed through the rings.

35. A machine for manufacturing link mesh having a ring magazine, a floor for said magazine, a plate movable horizontally between the lower end of the ring magazine and the upper surface of said floor for cutting off the lowest rings from the magazine and pushing them forward, mechanism for reciprocating the plate, a staple magazine, mechanism for cutting off staples from the staple magazine and passing the free ends through the rings pushed forward by said plate, and mechanism for closing the free ends of the staples after they have been passed through the rings.

36. A machine for manufacturing link mesh having a ring magazine with vertical parallel grooves in one face, a plate having curved grooves in its edge movable across the lower end of the ring magazine for cutting off and pushing forward the lowest rings in the magazine, mechanism for reciprocating the plate, a staple magazine, mechanism for cutting off staples from the staple magazine and passing the free ends through the rings, and mechanism for closing the free ends of the staples after they have been passed through the rings.

37. A machine for manufacturing link mesh having a ring magazine, mechanism for moving the ring magazine back and forth, a plate movable back and forth below the lower end of the magazine for cutting off and pushing forward the lowest rings in the magazine, mechanism for reciprocating the plate, a staple magazine, mechanism for cutting off staples from the staple magazine and passing the free ends through the rings, and mechanism for closing the free ends of the staples after they have been passed through the rings.

38. A machine for manufacturing link mesh having a ring magazine, a slide supporting said ring magazine, a pusher movable back and forth below the ring magazine, a slide to which said pusher is connected, said slide being supported by the slide that supports the magazine, mechanism for moving the magazine slide back and forth, mechanism for moving the pusher slide back and forth, a staple magazine, mechanism for cutting off staples from the staple magazine and passing the free ends through rings, and mechanism for closing the free ends of the staples after they have been passed through rings.

39. A machine for manufacturing link mesh having a ring magazine, a ring carrier member below the magazine, a ring carrier member above the lower carrier member, a pusher for cutting off rings and passing them between the carrier members, mechanism for moving the carrier members and presenting the rings to the staples, a staple magazine, mechanism for cutting off staples from the staple magazine and passing the free ends through the rings, and mechanism for closing the free ends of the staples after they have been passed through the rings.

40. A machine for manufacturing link mesh having a ring magazine, a ring carrier consisting of two members having comb teeth at their front edges, a pusher for cutting off rings from the magazine and passing them between the members of the carrier, a staple magazine, mechanism for cutting off staples from the staple magazine and passing the free ends through the rings held by the carrier, and mechanism for closing the free ends of the staples after they have been passed through the rings.

41. A machine for manufacturing link mesh having a ring magazine, a carrier, mechanism for reciprocating the carrier, a pusher for cutting off the lowest rings in the magazine and passing them to the carrier, a staple magazine, mechanism for cutting off staples from the staple magazine and passing the free ends through the rings held by the carrier, and mechanism for closing the free ends of the staples after they have been passed through the rings.

42. A machine for manufacturing link mesh having a ring carrier, a slide supporting said carrier, mechanism for reciprocating the slide, mechanism for feeding rings to the carrier, a staple magazine, mechanism for cutting off staples from the staple magazine and passing the free ends through the rings fed to the carrier, and mechanism for closing the free ends of the staples after they have been passed through the rings.

43. A machine for manufacturing link mesh having a ring carrier, a slide supporting said ring carrier, a ring magazine removably held by said slide, mechanism for feeding rings from the ring magazine to the carrier, a staple magazine, mechanism for cutting off staples from the staple magazine and passing the free ends through the rings, and mechanism for closing the free ends of the staples after they have been passed through the rings.

44. A machine for manufacturing link mesh having a ring carrier comprising a lower member with comb teeth at its front edge and an upper member with comb teeth at its front edge, mechanism for moving the carrier forward and back, mechanism for feeding rings to the carrier, a staple magazine, mechanism for cutting off staples from the staple magazine and passing the free ends through the rings, and mechanism for closing the free ends of the staples after they have been passed through the rings.

45. A machine for manufacturing link mesh having a carrier slide, mechanism for reciprocating said slide, a lower carrier member supported by said slide, an upper carrier member supported by said slide, a magazine removably supported by said slide, a pusher movable back and forth below the magazine and between the carrier members for feeding rings from the magazine to the carrier, said pusher being movably supported by said slide, a staple magazine, mechanism for cutting off staples from the staple magazine and passing the free ends through the rings fed to the carrier, and mechanism for closing the free ends of the staples after they have been passed through the rings.

46. A machine for manufacturing link mesh, having a ring magazine, mechanism for cutting off rings from the ring magazine and presenting them to the staples, a staple magazine, with parallel grooves arranged horizontally at the front of the machine, rods for guiding the staples arranged in the grooves in the magazine, mechanism for feeding the staples along the rods, mechanism for cutting off staples from the staple magazine and passing the free ends through the rings, and mechanism for closing the free ends of the staples after they have been passed through the rings.

47. A machine for manufacturing link mesh, having a ring magazine, mechanism for cutting off rings from the ring magazine and presenting them to the staples, rods for guiding staples removably secured in the machine, mechanism for feeding the staples along the rods, mechanism for passing the free ends of the staples through the rings, and mechanism for closing the free ends of the staples after they have been passed through the rings.

48. A machine for manufacturing link mesh, having a staple magazine with parallel grooves, rods removably held in said grooves, and mechanism for feeding the staples along the rods in said grooves.

49. A machine for manufacturing link mesh, having a ring magazine, mechanism for cutting off rings from the ring magazine and presenting them to the staples, a staple magazine having parallel grooves, rods removably located in said grooves, guiding rods extending in line with said removable rods in the grooves, mechanism for cutting off staples from the staple magazine and passing the free ends through the rings, and mechanism for closing the free ends of the staples after they have been passed through the rings.

50. A machine for manufacturing link mesh having a ring magazine, mechanism for cutting off rings from the ring magazine and presenting them to the staples, a staple magazine with parallel grooves, rods removably located in said grooves, guiding rods extending in line with said removable rods, feeders movable on said rods for advancing the staples, a pusher for cutting off staples from the staple magazine and passing the free ends through the rings, and mechanism for closing the free ends of the staples after they have been passed through the rings.

51. A machine for manufacturing link mesh having a ring magazine, mechanism for cutting off rings from the ring magazine and presenting them to the staples, a staple magazine with parallel grooves, rods removably located in said grooves, a bar extending across the staple magazine and retaining the ends of the removable rods, guiding rods secured to said bar and occupying the grooves in line with said removable rods, feeders for advancing the staples along the rods, mechanism for cutting off staples from the staple magazine and passing the free ends through the rings, and mechanism for closing the free ends of the staples after they have been passed through the rings.

52. A machine for manufacturing link mesh having a ring magazine, mechanism for cutting off rings from the ring magazine and presenting them to the staples, a staple magazine with parallel grooves, rods located in said grooves, feeders encircling said rods, mechanism for pushing the feeders simultaneously along the rods, mechanism for cutting off staples from the staple magazine and passing the free ends through the rings, and mechanism for closing the free ends of the staples after they have been passed through the rings.

53. A machine for manufacturing link mesh having a ring magazine, mechanism for cutting off rings from the ring magazine and presenting them to the staples, a staple magazine with parallel grooves, rods located in said grooves, feeders movable along said rods, yielding levers for advancing the feeders along the rods, mechanism for advancing the levers, mechanism for cutting off staples from the staple magazine and passing the free ends through the rings, and mechanism for closing the free ends of the staples after they have been passed through the rings.

54. A machine for manufacturing link mesh having a ring magazine, mechanism for cutting off rings from the ring magazine and presenting them to the staples, a staple magazine with parallel grooves, rods removably located in said grooves, feeders movable along said rods, yielding levers for advancing the pushers, a bar for limiting the movement of the levers, mechanism for advancing the bar and causing the feed of the staples along the rods, mechanism for cutting off staples from the staple magazine and passing the free ends through the rings, and mechanism for closing the free ends of the staples after they have been passed through the rings.

55. A machine for manufacturing link mesh having a ring magazine, mechanism for cutting off rings from the ring magazine and presenting them to the staples, a staple magazine with parallel grooves, rods located in said grooves, feeders movable on said rods, mechanism for moving the feeders quickly along the rods for feeding staples, mechanism for moving the feeder advancers slowly so they will follow up the staple feeders, mechanism for cutting off staples from the staple magazine and passing the free ends through the rings, and mechanism for closing the free ends of the staples after they have been passed through the rings.

56. A machine for manufacturing link mesh having a staple magazine with parallel grooves, rods located in said grooves, feeders movable on said rods, a feed carriage with levers for advancing the feeders, mechanism for moving the feed carriage quickly for advancing the feeders, and mechanism for moving the feed carriage slowly for following up the feeders as the staples are fed.

57. A machine for manufacturing link mesh having a staple magazine with parallel grooves, rods located in said grooves, feeders movable on said rods, a feed carriage for advancing the feeders, screw shafts for advancing the feed carriage, mechanism for reciprocating the screw shafts for causing the feed carriage and the feeders to feed the staples, and mechanism for rotating the screw shafts for causing the feed carriage to follow up the feeders.

58. A machine for manufacturing link mesh having a staple magazine with parallel grooves, rods located in said grooves, feeders movable on said rods, a feed carriage for advancing the feeders, screw shafts for advancing the feed carriage, mechanism for reciprocating the screw shafts, mechanism for rotating the screw shafts, and means for disconnecting said screw shaft actuating mechanisms, whereby the screw shafts may be turned backward for returning the feed carriage.

59. A machine for manufacturing link mesh having a staple magazine, feeders movable along the staple magazine, a feed carriage, levers mounted on said carriage, springs connected between said carriage and the levers for holding the levers in engagement with the feeders, a bar mounted on said carriage for limiting the movement of the levers, intermittently operated mechanism for advancing the feed carriage quickly, and constantly operated mechanism for advancing the feed carriage slowly.

60. A machine for manufacturing link mesh having a staple magazine with parallel grooves, rods removably located in said grooves, a yoke-shaped feeder movable freely back and forth along each rod, a lever with one end held by a spring against each feeder, mechanism for intermittently advancing the levers quickly, and mechanism for constantly advancing the levers slowly.

61. A machine for manufacturing link mesh having a staple magazine comprising a plural number of rods joined at one end, feeders movable along said rods, levers for advancing the feeders, mechanism for intermittently advancing the levers quickly, and mechanism for constantly advancing the levers slowly.

62. A machine for manufacturing link mesh having a ring magazine, mechanism for cutting off rings from the ring magazine and feeding them to the staples, a staple magazine, mechanism for feeding the staples along the staple magazine, a pusher plate movable vertically across the end of the magazine for cutting off a row of staples, mechanism for reciprocating the pusher, a carrier for receiving the staples cut off by the pusher and for passing the free ends of the staples through the rings, and mechanism for closing the free ends of the staples after they have been passed through the rings.

63. A machine for manufacturing link mesh having a ring magazine, mechanism for cutting off rings from the ring magazine and presenting them to the staples, a staple magazine, mechanism for feeding staples along the staple magazine, a ram, mechanism for raising and lowering the ram, a plate carried by the ram and movable across the end of the staple magazine, and a punch adapted to coöperate with the plate for closing the free ends of the staples.

64. A machine for manufacturing link mesh having a ring magazine, mechanism for cutting off rings from the ring magazine and presenting them to the staples, a staple magazine, mechanism for feeding staples along the staple magazine, a ram, mechanism for reciprocating the ram, a plate having comb teeth on one edge attached to the ram and movable across the end of the staple magazine, and a punch having comb teeth that coöperate with said plate for forming the staples into rings.

65. A machine for manufacturing link mesh having a ring magazine, mechanism for cutting off rings from the ring magazine and presenting them to the staples, a staple magazine, mechanism for feeding staples along the staple magazine, a carrier for receiving staples from the staple magazine, a plate movable across the end of the staple magazine and through the carrier, and mechanism adapted to coöperate with said plate for closing the free ends of the staples after they have been passed through the rings.

66. A machine for manufacturing link mesh having a ring magazine, mechanism for cutting off rings from the ring magazine and presenting them to the staples, a staple magazine, mechanism for feeding staples along the staple magazine, a vertically movable ram, a pusher plate attached to the ram and adapted to be moved back and forth across the end of the staple magazine, a lever adapted to raise said ram, springs adapted to draw said ram downwardly, a cam arranged to lift said lever, and a punch coöperating with said pusher plate for closing the free ends of the staples after they have been passed through the rings.

67. A machine for manufacturing link mesh having a ring magazine, mechanism for cutting off rings from the ring magazine and presenting them to the staples, a staple magazine, mechanism for feeding staples from the staple magazine, a carrier consisting of two separable members for receiving the staples and passing the free ends through the rings, and mechanism for closing the free ends of the staples after they have been passed through the rings.

68. A machine for manufacturing link mesh having a ring magazine, mechanism for cutting off rings from the ring magazine and presenting them to the staples, a staple magazine, mechanism for feeding staples from the staple magazine, a pusher for cutting off staples from the staple magazine, a carrier consisting of two separable members, one each side of the pusher, for receiving the staples and passing the free ends through the rings, and mechanism for closing the free ends of the staples after they have been passed through the rings.

69. A machine for manufacturing link mesh having a ring magazine, mechanism for cutting off rings from the ring magazine and presenting them to the staples, a staple magazine, mechanism for feeding staples from the staple magazine, a pusher for cutting off staples from the staple magazine, a carrier provided with comb teeth at its edge for receiving the staples cut off by the pusher, and mechanism for closing the free ends of the staples after they have been passed through the rings.

70. A machine for manufacturing link mesh having a ring magazine, mechanism for cutting off rings from the ring magazine and presenting them to the staples, a staple magazine, mechanism for feeding staples from the staple magazine, a pusher for cutting off staples from the staple magazine, a carrier for receiving the staples, said carrier comprising two members, one member having comb teeth on its edge and the other member having a plate provided with comb teeth on its edge, said pusher being movable between the two members of the carrier, and mechanism for closing the free ends of the staples after they have been passed through the rings.

71. A machine for manufacturing link mesh having a ring magazine, mechanism for cutting off rings from the ring magazine, a staple magazine, mechanism for feeding staples from the staple magazine, a pusher for cutting off staples from the staple magazine, a carrier movable vertically at the end of the staple magazine, said carrier consisting of two parts between which the pusher moves, and mechanism for closing the free ends of the staples after they have been passed through the rings.

72. A machine for manufacturing link mesh having a ring magazine, mechanism for cutting off rings from the ring magazine and presenting them to the staples, a staple magazine, mechanism for feeding staples from the staple magazine, a pusher for cutting off staples from the staple magazine, vertically movable slides, a carrier member with its ends attached to said slides, a carrier member supported by the first mentioned carrier member, said pusher being movable between the carrier members, and mechanism for closing the free ends of the staples after they have been passed through the rings.

73. A machine for manufacturing link mesh having a ring magazine, mechanism for cutting off rings from the ring magazine and presenting them to the staples, a staple magazine, mechanism for feeding staples from the staple magazine, a vertically movable ram, a pusher carried by said ram for cutting off staples from the staple magazine, a carrier supported by said ram and having a vertical movement independent thereof, and mechanism for closing the free ends of the staples after they have been passed through the rings.

74. A machine for manufacturing link mesh having a ring magazine, mechanism for cutting off rings from the ring magazine and presenting them to the staples, a staple magazine, mechanism for feeding staples from the staple magazine, a vertically movable ram, a pusher carried by said ram, cams and levers for lifting said ram and pusher, springs for drawing said ram and pusher downward, a carrier, slides supporting said carrier, said slides being held by and vertically movable in the pusher ram, cams and levers for lifting said carrier, springs for drawing down said carrier, and mechanism for closing the free ends of the staples after they have been passed through the rings.

75. A machine for manufacturing link mesh having a ring magazine, mechanism for cutting off rings from the ring magazine and presenting them to the staples, a staple magazine, mechanism for feeding staples from the staple magazine, a pusher for cutting off staples from the staple magazine, a carrier, mechanism for raising and lowering the carrier independently of the pusher, mechanism for opening and closing the carrier, and mechanism for closing the free ends of the staples after they have been passed through the rings.

76. A machine for manufacturing link mesh having a ring magazine, mechanism for feeding rings from the ring magazine, a staple magazine, mechanism for feeding staples from the staple magazine, a carrier for receiving staples from the staple magazine and passing their free ends through the rings, said carrier consisting of two members, mechanism for raising and lowering both carrier members together, mechanism for opening one carrier member from the other, and mechanism for closing the free ends of the staples after they have been passed through the rings.

77. A machine for manufacturing link mesh having a ring magazine, mechanism for feeding rings from the ring magazine, a staple magazine, mechanism for feeding staples from the staple magazine, a carrier for receiving staples from the staple magazine and passing the free ends of the staples through the rings, said carrier consisting of two members, both vertically movable together and one horizontally movable with relation to the other, a ring stop supported by one of the carrier members, and mechanism for closing the free ends of the staples after they have been passed through the rings.

78. A machine for manufacturing link mesh having a ring magazine, mechanism for feeding rings from the ring magazine, a staple magazine, mechanism for feeding staples from the staple magazine, a carrier for receiving staples from the staple magazine and passing the free ends through the rings, said carrier consisting of two members, both vertically movable together and one horizontally movable with relation to the other, a ring stop secured to the horizontally movable member of the carrier, and mechanism for closing the free ends of the staples after they have been passed through the rings.

79. A machine for manufacturing link mesh having a ring magazine, mechanism for feeding rings from the ring magazine, a staple magazine, mechanism for feeding staples from the staple magazine, a carrier for receiving staples from the staple magazine, said carrier consisting of two members adapted to be opened and closed, a punch for closing the free ends of the staples, mechanism for reciprocating the punch, and mechanism carried by the punch operating mechanism for opening the carrier members.

80. A machine for manufacturing link mesh having a ring magazine, mechanism for feeding rings from the ring magazine, a staple magazine, mechanism for feeding staples from the staple magazine, a carrier for receiving the staples from the staple magazine and passing the free ends through the rings, said carrier comprising two members, mechanism for raising and lowering the carrier members, springs for closing the carrier members, a punch for closing the free ends of the staples after they have been passed through the rings, mechanism for raising and lowering the punch, and spring plungers carried by the punch raising and lowering mechanism for opening the carrier.

81. A machine for manufacturing link mesh having a ring magazine, mechanism for feeding rings from the ring magazine, a staple magazine, mechanism for feeding staples from the staple magazine, a carrier comprising two members, one supported by the other, mechanism for raising and lowering the carrier, a punch, mechanism for raising and lowering the punch, spring plungers carried by the punch raising and lowering mechanism for opening the carrier, and adjustable stops for limiting the amount of opening of the carrier.

82. A machine for manufacturing link mesh having a ring magazine, mechanism for feeding rings from the ring magazine, a staple magazine, mechanism for feeding staples from the staple magazine, a carrier comprising two vertically movable members, one member being movable horizontally with relation to the other, a punch, mechanism for raising and lowering the punch, spring plungers carried by the punch raising and lowering mechanism, adjustable plates secured to the horizontally movable member of the carrier and adapted to be engaged by said spring plungers for opening the carrier, and adjustable plates attached to a fixed part for limiting the amount of opening of the carrier.

83. A machine for manufacturing link mesh having a ring magazine, mechanism for feeding rings from the ring magazine, a staple magazine, mechanism for feeding staples from the staple magazine, a vertically movable carrier member, rods extending through said carrier member, a carrier member held by said rods, springs for holding said last mentioned carrier member closed with relation to the first mentioned carrier member, mechanism for closing the free ends of the staples after they have been passed through the rings, and mechanism operated by said staple closing mechanism for opening said carrier.

84. A machine for manufacturing link mesh having a staple magazine, mechanism for feeding staples from the staple magazine, a vertically movable ram, a pusher carried by said ram for cutting off staples from the staple magazine, a carrier for receiving staples cut off by the pusher, said carrier consisting of two members, one member being supported by the other and both being supported by said ram, springs normally holding the carrier members closed, a punch for closing the free ends of the staples, mechanism for reciprocating the punch, and mechanism carried by said punch reciprocating mechanism for opening the carrier.

85. A machine for manufacturing link mesh having a ring magazine, mechanism for feeding rings from the ring magazine, a staple magazine, mechanism for feeding staples from the staple magazine, a vertically movable ram and a punch plate carried by said ram and adapted to close the free ends of the staples.

86. A machine for manufacturing link mesh having a ring magazine, mechanism for feeding rings from the ring magazine, a staple magazine, mechanism for feeding staples from the staple magazine, a pusher for cutting off staples from the staple magazine, said pusher having circular notches in its free edge, a punch having circular notches in its free edge, said punch being adapted to coöperate with said pusher for closing the free ends of the staples.

87. A machine for manufacturing link mesh, having a ring magazine, mechanism for feeding rings from the ring magazine, a staple magazine, mechanism for feeding staples from the staple magazine, a pusher adapted to cut off staples from the staple magazine, a carrier adapted to hold the staples cut off by the pusher, a punch adapted to coöperate with the pusher for closing the free ends of the staples, mechanism for reciprocating the punch, and mechanism carried by the punch reciprocating mechanism for opening the carrier.

88. A machine for manufacturing link mesh, having mechanism for successively feeding rows of loose rings, mechanism for feeding the free ends of staples through the rings of one row and engaging said rings, mechanism for feeding the free ends of the staples through the rings of the following row, and mechanism for closing the free ends of the staples after they have been passed through four adjacent rings.

89. A machine for manufacturing link mesh, having mechanism for successively feeding rows of loose rings, mechanism for feeding the free ends of staples through the rings of two rows, mechanism for holding the rings and staples, and mechanism movable on both sides of the staples for forming them into rings.

90. A machine for manufacturing link mesh having a ring magazine, a ring carrier comprising two members with separated channels between said members, a pusher for cutting off rings from the magazine and feeding them through said channels, a staple magazine, mechanism for cutting off staples from the staple magazine and passing the free ends through the rings, and mechanism for closing the free ends of the staples after they have been passed through the rings.

91. A machine for manufacturing link mesh having a ring magazine, a ring carrier comprising two members, parallel ribs separating said members and dividing the space between them into closed channels, a pusher for cutting off rings from the magazine and feeding them through said channels, a staple magazine, mechanism for cutting off staples from the staple magazine and passing the free ends through the rings, and mechanism for closing the free ends of the staples after they have been passed through the rings.

92. A machine for manufacturing link mesh having a ring magazine, a ring carrier comprising two members, parallel ribs separating said members and dividing the space between them into closed channels, said members having notches in the edges at the ends of the channels, a pusher for cutting off rings from the magazine and feeding them through said channels, said pusher having notches that conform to the rings in its front edge, a staple magazine, mechanism for cutting off staples from the staple magazine and passing the free ends through the rings, and mechanism for closing the free ends of the staples after they have been passed through the rings.

93. A machine for manufacturing link mesh having a ring magazine, a ring carrier, mechanism for cutting off rings from the magazine and feeding them through the carrier, a staple magazine, a staple carrier comprising two members, parallel ribs separating said staple carrier members and dividing the space between into closed channels, a pusher for cutting off staples from the staple magazine and feeding them through said channels, and mechanism coöperating with said staple pusher for closing the free ends of the staple after they have been passed through the rings.

94. A machine for manufacturing link mesh having a ring magazine, a ring carrier, mechanism for cutting off rings from the magazine and feeding them through the carrier, a staple magazine, a staple carrier having closed channels and notches in its edges at the ends of the channels, a pusher for cutting off staples from the staple magazine and passing them through said channels, said pusher having notches conforming to the staples in its edge, and mechanism coöperating with said staple pusher for closing the free ends of the staples after they have been passed through the rings.

95. A machine for manufacturing link mesh having a ring carrier with closed parallel channels, mechanism for feeding the rings through said channels of the carrier, a staple carrier having closed parallel channels, mechanism for feeding staples through said channels and through the rings at the ends of the channels of the ring carrier, and mechanism coöperating with the staple feeding mechanism for closing the free ends of the staples after they have been passed through the rings.

In testimony whereof we have signed our name to this specification in the presence of two subscribing witnesses, this 24th day of June, 1912.

JOSEPH MERRITT.
WILLIAM A. SAWYER.

Witnesses:
CAROLINE M. BRECKLE,
CHARLOTTE S. HULL.